Dec. 2, 1969  E. L. LUSTENADER  3,481,120
AXIAL WATER-STEAM SEPARATOR
Original Filed May 28, 1964
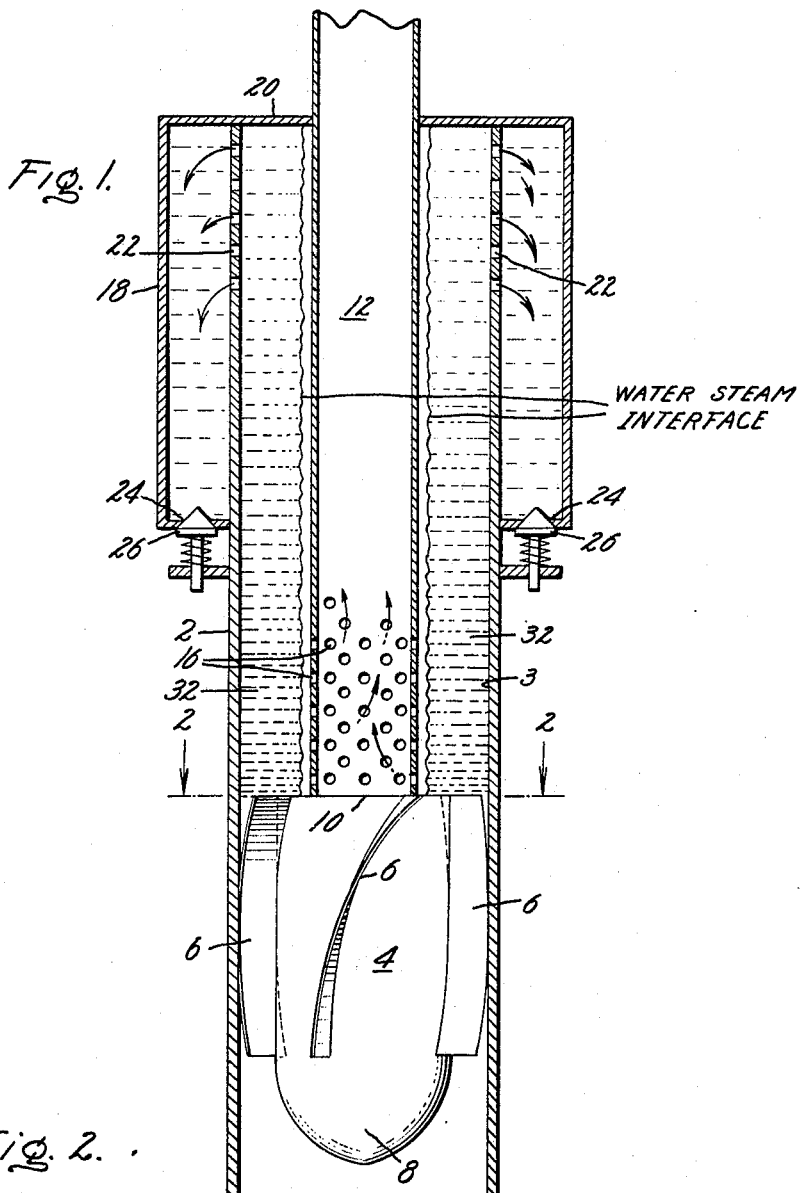
Inventor
Edward L. Lustenader
by  Paul A. Frank
His Attorney United States Patent Office 3,481,120
Patented Dec. 2, 1969

3,481,120
AXIAL WATER-STEAM SEPARATOR
Edward L. Lustenader, Scotia, N.Y., assignor to General Electric Company, a corporation of New York
Continuation of application Ser. No. 370,951, May 28, 1964. This application Mar. 6, 1967, Ser. No. 621,070
Int. Cl. B04c 1/00
U.S. Cl. 55—432                     7 Claims

ABSTRACT OF THE DISCLOSURE

An axial water-steam separtor having an outer closed end tube and a pod with vortex vanes on said pod mounted in the tube to give the fluid passing through the tube a whirling motion. This whirling motion causes the denser phase to centrifuge against the outer wall of the closed end tube. A smaller tube is mounted co-axial with the closed end tube and passes through the closed end of the outer closed end tube with its open end lying remote from the closed end and near the pod. The liquid whirling about effects separation of the liquid from air. Liquid goes out of the outer tube and the gas passes out through the inner tube.

---

This application is a continuation of application Ser. No. 370,951, filed May 28, 1964, now abandoned.

The present invention relates to separators and, more particularly, to an axial type water steam separator.

During the operation of modern equipment, two distinct phases may be present in an area where only one is desirable. The removal of the undesirable phase then becomes essential for further operation of the equipment.

In equipment, where both steam and water are present simultaneously, steam will become entrained in the water as it passes through the equipment. A separation process is then required to remove this steam with the least effect on the flowing water. Presently, in the separation of steam from water, steam in the form of vapor partially remixes with the liquid before it is removed. This repassing or remixing of the steam with the liquid results in high shear forces and reentrainment of part of the steam vapor in the liquid as it passes therethrough. This reentrainment necessitates longer and more complex separators for proper separation of steam from a water steam mixture.

The present invention envisions a separator having means for removing the steam from a water steam mixture without having the steam repass through the water during separation.

The chief object of the present invention is the provision of a separator which maintains a separate stable relationship between the separated parts of a mixture during the separation process.

Another object of the present invention is the provision of a separator having means for controlling the relative proportions of each phase in a two-phase mixture.

Another object of the present invention is the provision of a separator which operates in any position unaffected by the forces of gravity.

Another object of the present invention is the provision of a separator having a stable water steam interface to prevent remixing of the water and steam during separation.

A further object of the present invention is the provision of a separator having a controllable discharge.

These and other objects of my invention will be more readily perceived from the description which follows.

One of the features of the present invention is a highly efficient water steam separator, including means to separate the steam and the water and have them remain separated without the steam reentraining itself in the water during the remainder of the separation process.

The attached drawing illustrates a preferred embodiment of the present invention in which:

FIGURE 1 is a perspective view in section of the above apparatus;

FIGURE 2 is a sectional view of the separator of FIGURE 1 taken along line 2—2.

In FIGURE 1 there is shown a sectional view of the axial water steam separator embodying the present invention. The construction includes a hollow tube 2 having a uniform inside diameter, as shown in FIGURE 2. Coaxially positioned inside tube 2, towards entrance 30 thereof, is cylindrical center body 4 having radial swirl vanes 6 projecting therefrom around its periphery. End 8 of center body 4 proximate to entrance 30 of tube 2 tapers to a point concentric with the axis of tube 2. Vanes 6 are curved in a gradually increasing slope from a point just beyond tapered section 8 of body 4, to end 10 of body 4, which slope provides the necessary swirl to the incoming stream. These vanes are suitably fastened to the inside walls of tube 2 so as to remain stationary regardless of the pressure in tube 2. The number and placement of these vanes on center body 4 is dependent on the variables involved in the phases being separated, and the four shown in the illustrations should not be considered as a limitation. Projecting from end 10 of center body 4 is hollow tube 12, smaller in diameter than tube 2 and concentrically located within it. The tube 12, proximate center body 4, and located approximately midway through tube 2, has a series of circular apertures 16 around its periphery for the reception of the separated steam.

Surrounding tube 2 and coaxial with it at the opposite end thereof from the location of center body 4 is larger diameter tube 18. This tube is closed at one end by end wall 20 which closure also closes the end of tube 2, although permitting tube 12 to pass therethrough. Tube 18 communicates with tube 2 through a series of apertures 22, located around the periphery of tube 2 proximate end wall 20. At the opposite end of tube 18 from wall 20 is a peripheral annulus 24 formed by the space between tube 2 and tube 18. Annulus 24 has a valve or a plurality of valves 26 for controlling the discharge flow from tube 2. Valves 26 are spring biased or otherwise suitably operable so as to be responsive to the total pressure of the water in tube 2. They thus open at a predesignated total pressure.

In operation, the two phase flow enters tube 2 at inlet point 30 thereof. As it passes the inlet point, it comes into contact with the leading tapered edge 8 of center body 4, which causes the flow to distribute itself around the center body and into contact with swirl vanes 6. These swirl vanes being tapered and so positioned that the flow cannot go around them, gradually impart a swirl to the incoming flow. This swirling effect creates a vortex in the area 32 located beyond end 10 of center body 4 and in the main area of tube 2. This vortex causes the more dense or heavier phase, e.g., water to be spun by centrifugal force outward towards inner surface 3 of tube 2. At the same time, the less dense or lighter phase, e.g., steam is forced inwards towards the center of the vortex; the area immediately adjacent and surrounding tube 12. Thus, the vortex separates the heavier substance from the lighter substance, forcing the latter towards the center of tube 2, and the former towards the outer wall 3 of tube 2.

Tube 12, a vortex finder tube, is so proportioned that its diameter is less than the stable core diameter of the separator. This results in a stable water gas interface surrounding tube 12, and thus a high efficiency. Due to this proportioning, the gas surrounding tube 12 has a negligible axial velocity, but a significant rotational velocity because of the rotational velocity of the vortex. Since gas has uniform pressure throughout, at an equal distance from an object, the pressure of the gas surrounding tube 12 at any points along its length, at the same distance from tube 12, is the same. Therefore, as more flow enters tube 2 more steam is formed around tube 12, increasing the pressure of the steam and causing its discharge through apertures 16 in tube 12. Thus, no matter how much flow enters tube 2, nor how fast this flow is traveling, slots 16 in tube 12 exhaust the gas as fast as desirable. This stability of the water steam interface permits the steam to be discharged through tube 12 without its undesirable remixture into the heavier water stream being withdrawn from tube 2. The existence of this stable interface results in the high efficiency obtainable by this separator. This stable interface prevents either the heavier or the lighter mixture from reentering the other and being undesirably withdrawn with that phase or necessitating a subsequent removal operation.

The modified free vortex established in tube 2 causes the heavier, denser, mixture because of its greater density to be spun outwards by centrifugal force towards outer wall 3 of tube 2 and eventually towards apertures 22 which perforate tube 2 in the vicinity of end wall 20. This heavy mixture being spun towards end wall 20 and at the same time towards outer wall 3 of tube 2 contacts end wall 20 and is forced out through slots 22 in tube 2 and into surrounding tube 18. Peripheral annulus 24 between tube 18 and tube 2 serves to bleed off this heavier phase from the separator. A valve 26 or a plurality thereof are constructed to regulate the amount of flow that is bled off. Valves 26 are positioned in the only possible exit of the heavier phase annulus 24, and are spring biased to be responsive to a desired preset pressure of water in tube 2. They regulate the amount of the heavier phase being bled off, and also regulate the amount of this phase in existence in the vortex in tube 2. By presetting valves 26, the interface between the lighter and heavier phases existing in tube 2 can be regulated. For example, if the valves are preset to require a high pressure of the heavier phase before they open, the heavier phase will exist in a larger proportion than normally, since it will be unable to exit through annulus 24, whereas the lighter phase being able to exit through slots 16 is forced out faster by this increase in pressure of the heavier substance surrounding it. Thus, the diameter of the steam water interface moves closer to tube 12 because of this increased pressure. On the other hand, if valves 26 are preset to require a low pressure to open, the heavier substance will be removed through annulus 24 as fast as it forms. The pressure then exerted by the gas on the water will be greater than the pressure exerted by the water on the gas and the steam water interface will move towards inner walls 3 of tube 2 until the pressures of the phase equalize, at which point the interface will come to rest. Because of the ability to control the position of this interface, the amount of either mixture being discharged can be controlled by presetting valves 26, to the desired pressure.

It will be appreciated that because a vortex principle employing centrifugal force is used for this separation process, the position of the separator is unaffected by gravitational forces.

The separator is constructed to remove a light phase interspersed in a heavier phase where the heavier phase constitutes a large proportion of the total mixture and is the important phase desired to be retained; alternatively the lighter phase may be retained, if desired.

It is now apparent that the invention attains the objectives set forth. Apparatus embodying the invention is sturdy in construction and well adapted for use in conjunction with various environments. Extraction is accomplished in a highly efficient manner with full control over the phase desirable of retention and the phase desirable of removal.

What I claim as new and desire to secure by Letters Patent of the United States is:

1. An axial flow separator comprising:
   tube means having a closed end for containing a flow stream and perforations in the tube wall near said closed end,
   means for imparting a vortex to said flow stream whereby the lighter and heavier parts of said flow stream are separated in said tube means,
   a tube axially positioned in said vortex with its longitudinal axis lying along the same line as the longitudinal axis of said tube means and having apertures in the end of said tube remote from the closed end of said tube means and lying adjacent said vortex means for receiving the lighter part of said flow stream through said apertures, and
   means responsive to the pressure of the heavier part of said flow stream for opening and closing a passage leading from said perforations.

2. An axial flow separator comprising:
   a hollow tube having a closed end and perforations near said end for conducting a flow stream,
   a set of nonrevolvable swirl vanes positioned inside said hollow tube and remote from said closed end whereby the less and more dense phases of said flow stream are separated,
   a tube of diameter less than the hollow tube and mounted with its longitudinal axis aligned with the longitudinal axis of said hollow tube to extend through its closed end to maintain a stable interface between the phases and containing apertures at the upstream end of said tube for receiving the less dense phase of said flow stream, and
   a larger tube surrounding said hollow tube for receiving the denser phase of said flow stream through the perforations in said hollow tube.

3. An axial flow separator as in claim 2 where said hollow tube and said larger hollow tube form therebetween an annulus through which the denser phase of said flow stream is passed.

4. An axial flow separator as in claim 2 further comprising valve means for controlling the amount of the respective phases separated.

5. An axial flow separator comprising:
   a hollow tube having a closed end for containing a flow stream and perforations in the wall of said hollow tube near said closed end,
   a set of nonrevolvable swirl vanes mounted onto a central body and positioned inside of and remote from the perforated end of said hollow tube whereby the less and more dense phases of said flow stream are separated,
   a second tube of a diameter less than the hollow tube mounted with its longitudinal axis-coincident with the longitudinal axis of the hollow tube and extending through the closed end of said hollow tube up to near said swirl vanes to maintain a stable interface between the phases of said flow stream,
   apertures in said second tube near said swirl vanes for receiving the less dense phase of said flow stream,
   an outer collection means surrounding said hollow tube for receiving the denser phase of said flow stream, and
   a valve means responsive to a predesignated pressure of said more dense phase in said collection means to open and allow said more dense phase to escape from said outer collection means.

6. An axial flow separator as in claim 5 where said hollow tube and said collection means form therebetween a space in which the denser phase of said flow stream is received.

7. An axial flow separator as in claim 5 in which said pressure responsive means are a plurality of pressure release valves.

References Cited

UNITED STATES PATENTS

| | | | |
|---|---|---|---|
| 2,186,344 | 1/1940 | Price | 55—456 |
| 2,592,530 | 4/1952 | Artsay | 55—55 |
| 2,648,397 | 8/1953 | Ravese et al. | 55—457 |
| 2,709,502 | 5/1955 | Toth et al. | 55—442 |
| 2,843,265 | 7/1958 | Rakowsky | 209—211 |
| 3,019,856 | 2/1962 | Patterson | 55—442 |
| 3,251,176 | 5/1966 | Gleason | 55—452 |
| 3,253,999 | 5/1966 | Weisman | 55—348 |

HARRY B. THORNTON, Primary Examiner

B. NOZICK, Assistant Examiner

U.S. Cl. X.R.

55—457